L. JAENICHEN.
SCALE.
APPLICATION FILED JAN. 15, 1916.
1,185,675.
Patented June 6, 1916.
2 SHEETS—SHEET 1.
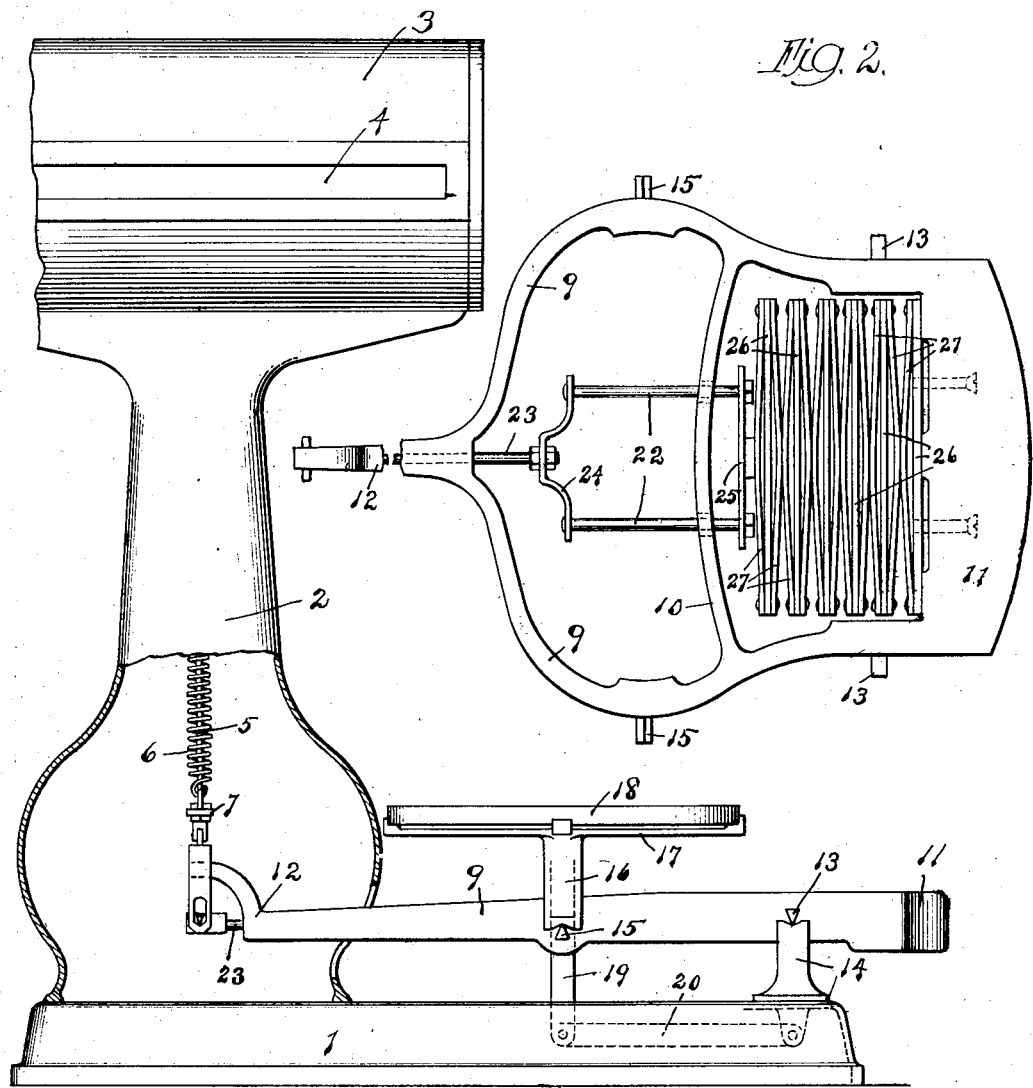

L. JAENICHEN.
SCALE.
APPLICATION FILED JAN. 15, 1916.
1,185,675.
Patented June 6, 1916.
2 SHEETS—SHEET 2.
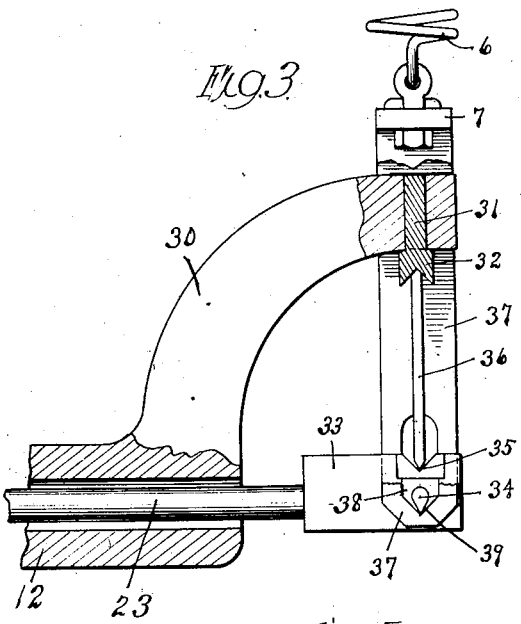
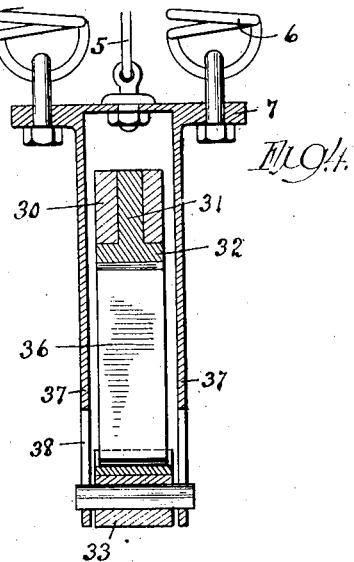
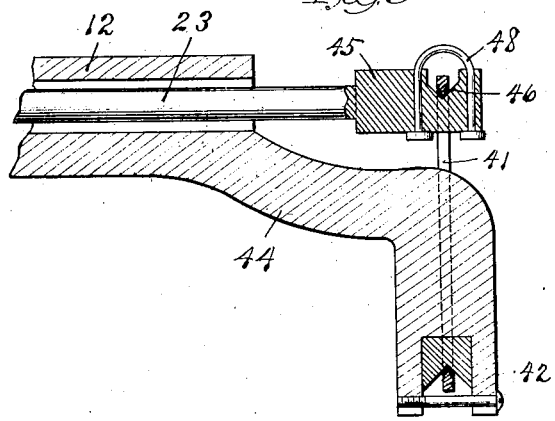
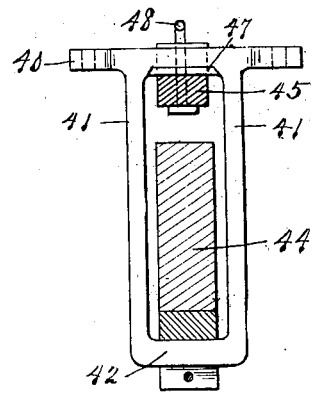
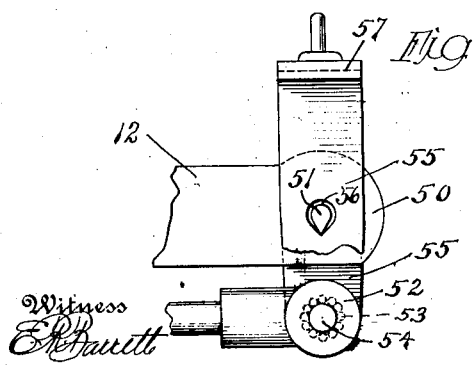
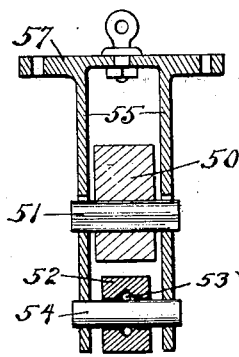
Inventor
Louis Jaenichen
Witness
E. K. Barrett
By
Pagelsen and Spencer
Attorneys

UNITED STATES PATENT OFFICE.

LOUIS JAENICHEN, OF DETROIT, MICHIGAN, ASSIGNOR TO STANDARD COMPUTING SCALE COMPANY, LIMITED, OF DETROIT, MICHIGAN, A LIMITED PARTNERSHIP.

SCALE.

1,185,675.

Specification of Letters Patent.

Patented June 6, 1916.

Application filed January 15, 1916. Serial No. 72,187.

*To all whom it may concern:*

Be it known that I, LOUIS JAENICHEN, a citizen of the United States, and residing at Detroit, in the county of Wayne and State of Michigan, have invented a new and Improved Scale, of which the following is a specification.

This invention relates to computing scales in which the relative lengths of the lever arms are varied by means of thermostats, and its object is to provide a movable connection between the load-resisting springs and the main lever of the scale which connection shall involve a minimum amount of friction.

This invention consists, in combination of a load receiving lever, a load resisting member connected thereto, a thermostat for shifting one member relative to the other and novel connecting mechanism between the lever and the load resisting member provided with knife edge pivots whereby the friction between said members is kept down to a minimum.

In the accompanying drawings, Figure 1 is an elevation of a scale having a portion of the pedestal broken away. Fig. 2 is a plan of the main lever of this scale. Fig. 3 is a longitudinal section and Fig. 4 is a transverse section of the main lever through the connection between the main lever and the load resisting springs. Fig. 5 is a longitudinal and Fig. 6 a transverse section of the main lever through a modified form of connection for the springs. Figs. 7 and 8 are corresponding views of still another modification of this general idea.

Similar reference characters refer to like parts throughout the several views.

In all spring scales, the springs become slightly weaker with increasing temperatures, and hence a given load on the load receiver will cause slightly greater expansion of the springs at high temperatures than at low, usually resulting in "short weight." On the other hand, if the scale is sealed at high temperature, the scale will weigh "long" during colder weather. The relative lengths of the two arms of the main scale lever can be so changed as to counteract this action of the springs, but devices for such purpose must operate with a minimum of friction at all times. I propose to provide a thermostat to vary the effective length of the arm of the main lever to which the spring is attached, the load arm remaining constant.

In the drawings, the base 1 of the scale supports a pedestal 2, and on this is mounted a shell 3 having a window 4 through which the figures on an ordinary indicating drum can be seen. This drum is actuated by a rod 5, and the movement of this rod may be resisted by a pair of springs 6. The springs and indicator rod 5 may connect to a cross-bar 7 in any desired manner.

The main lever (Fig. 2) is formed of side bars 9, an intermediate cross bar 10, a heavy counter-weight 11, and an extension or neck 12. This lever has pivots 13 that rest on the posts 14 carried by the base and pivots 15 on which rest the posts 16 of the support 17 of the platform 18. A stem 19 on the platform support receives one end of the link 20, the other end of the link being pivoted below the pivots 13 in the usual manner.

A pair of rods 22 are slidable in the cross bar 10 and connect to the rod 23 by means of a small bar 24. These rods are also joined by the bar 25 that connects to a thermostat formed of members 26 and 27, the members 26 having higher coefficients of expansion than the members 27, the former being preferably of brass and the latter of steel. This thermostat is connected to the part 10 of the main lever and serves to draw the rod 23 toward the pivots 13 as the temperature increases and to force it outwardly as the temperature falls. Any other desired form of thermostat, lever, and platform support may be employed as the parts thus far described form no part of the present invention.

Referring now to Figs. 3 and 4, it will be noticed that the extension 12 of the main lever is formed with an upwardly extending arm 30 that carries a pin 31 to which is connected a bearing 32. The rod 23 has a head 33 on its outer end and is provided with the knife edge pivots 34 and a bearing 35. A bearing plate 36 having pivots at its ends engaging in the bearings 32 and 35 transmits the downward thrust of the arm 30 of the main lever to the head 33, while the side plates 37 on the cross bar 7 are formed with openings 38 and bearings 39 to receive the pivots 34 and thus transmit this downward pressure from the main lever to the springs 6.

It will be understood that there is always some downward pull on the springs 6 because of the weight of the lever and platform, although some of this weight may be counterbalanced by the part 11 of the scale lever. When therefore the inner end of the lever is depressed by a load, the arm 30 will press down on the compression member 36 and through it, down on the head 33 and the pivots 34. The distance from the pivot 13 to the pivot 34 is the length of the lever arm and will depend upon the action of the thermostat.

As there is no stress on those portions of the rods 22 that extend through the cross bar 10, the friction at this point may be disregarded. The friction at the bearings 32 and 35 may also be disregarded as it is merely theoretical. The action of the thermostat therefore is not interfered with in any manner and it operates freely irrespective of the force transmitted by the plates 37 from the pivots 34 to the cross bar 7 and to the indicator rod 5 and springs 6. This connection whereby force is transmitted from the end of the lever to the adjacent movable end of the rod 23 may be varied in many ways. In Figs. 3 and 4 this connection is on the order of a compression member, while in Figs. 5 and 6, the connecting member is in tension. The cross-bar 40 has connected to it the flat side bars 41 which are joined by the lower member 42, whose upper edge is in the form of a knife-edge to engage the bearing 43 carried by the downwardly extending arm 44 on the part 12 of the main lever. The rod 23 has a head 45 formed with a bearing 46 to receive the knife-edge 47 on the cross-bar 40. A small loop or stirrup 48 serves as a connection for the indicator rod. Still another connection is shown in Fig. 7. The end 12 of the lever is formed with an end 50 which carries pivots 51. The rod 23 carries an end 52 formed with a groove for the bearing balls 53 that bear on the short shaft 54. This shaft is secured in the lower ends of the side plates 55 that are formed with openings 56 to receive the pivots 51, and these plates connect to the cross-bar 57. When this construction is employed, the bars 26 of the thermostat must be of steel or other metal of lower coefficient of expansion than the bars 27. In each of these three cases, the connection between the springs, indicator rod, main lever and thermostat are substantially frictionless.

I claim:—

1. In a weighing scale, the combination of a main lever, a spring to resist the movement of the lever under a load, a thermostat mounted on said lever, a member pivotally connected to said lever and to said spring, and means connected to said thermostat and said spring for varying the effective length of the lever.

2. In a weighing scale, the combination of a main lever, a spring to resist the movement of the lever under load, a link to which the spring is connected, a thermostat mounted on the lever, a rod connecting the thermostat to said bar whereby the thermostat may move the end of the spring toward and away from the fulcrum of the lever, and a connecting member extending between and pivotally engaging the lever and said link at the end of the spring whereby stresses may be transmitted from the lever to the spring with substantially no friction.

3. In a weighing scale, the combination of a main lever, a spring to resist the movement of the lever under a load, a thermostat mounted on the lever, a rod connected to said thermostat and extending parallel to the line of the scale, a load resisting spring connected to said rod adjacent the end of said lever, and a connecting member adjacent the spring and having knife-edge pivots engaging said rod and lever whereby the lever may transmit stresses due to loads on the scale to said spring, the length of the lever arm being controlled by said rod and thermostat.

4. In a weighing scale, the combination of a main lever, a spring to resist the movement of the lever under a load, a thermostat mounted on the lever, a rod connected to said thermostat and extending parallel to the line of the scale, a load resisting spring connected to said rod adjacent the end of said lever, and a connecting member adjacent the spring and having knife-edge pivots engaging said rod and lever whereby the lever may transmit stresses due to loads on the scale to said spring, the length of the lever arm being controlled by said rod and thermostat, the end of the lever being curved in a vertical plane away from said rod to permit the connecting member to be of considerable length.

In testimony whereof I sign this specification.

LOUIS JAENICHEN.